US008346801B2

(12) United States Patent
Hagg et al.

(10) Patent No.: US 8,346,801 B2
(45) Date of Patent: Jan. 1, 2013

(54) CONTEXT BASED VIDEO FINDER

(75) Inventors: Wilhelm Hagg, Korb (DE); Jana Eggink, Stuttgart (DE); Thomas Kemp, Esslingen (DE); Franck Giron, Waiblingen (DE); Javier Alonso Garcia, Stuttgart (DE)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 12/717,415

(22) Filed: Mar. 4, 2010

(65) Prior Publication Data

US 2010/0250585 A1 Sep. 30, 2010

(30) Foreign Application Priority Data

Mar. 24, 2009 (EP) .................................... 09004184

(51) Int. Cl.
*G06F 17/30* (2006.01)
(52) U.S. Cl. ........ 707/772; 707/728; 707/732; 707/766; 707/802
(58) Field of Classification Search .............. 707/1, 100, 707/104, 769, 772, 766, 804, 913, 916, 728, 707/732, 802
See application file for complete search history.

(56) References Cited

U.S. PATENT DOCUMENTS

| 6,993,532 | B1 | 1/2006 | Platt et al. |
| 7,356,830 | B1 * | 4/2008 | Dimitrova ........................ 725/51 |
| 7,685,132 | B2 * | 3/2010 | Hyman .................... 707/999.01 |
| 7,756,915 | B2 * | 7/2010 | Ben-Yaacov et al. ......... 707/899 |
| 7,777,125 | B2 * | 8/2010 | Platt et al. ....................... 84/616 |
| 7,870,574 | B2 * | 1/2011 | Kenyon et al. .................. 725/19 |
| 7,881,657 | B2 * | 2/2011 | Wang et al. ................. 455/3.02 |
| 7,949,050 | B2 * | 5/2011 | Xu et al. .................. 375/240.22 |
| 8,073,854 | B2 * | 12/2011 | Whitman et al. ............. 707/749 |
| 8,208,643 | B2 * | 6/2012 | Zhang ............................. 381/56 |
| 2003/0105743 | A1 * | 6/2003 | Ireton ................................ 707/3 |
| 2006/0080356 | A1 * | 4/2006 | Burges et al. ............. 707/103 R |
| 2006/0092281 | A1 | 5/2006 | Herley et al. |
| 2007/0038612 | A1 | 2/2007 | Sull et al. |
| 2008/0059453 | A1 | 3/2008 | Laderman |
| 2008/0109404 | A1 | 5/2008 | Holm |
| 2009/0228423 | A1 * | 9/2009 | Hicken et al. ................... 706/54 |
| 2011/0035373 | A1 * | 2/2011 | Berg et al. ..................... 707/723 |

OTHER PUBLICATIONS

Iftikhar Ahmad, et al., "Audio-based Queries for Video Retrieval over Java Enabled Mobile Devices", Proc. of SPIE-IS&T Electronic Imaging, vol. 6074, XP040218064, Jan. 17, 2006, pp. 607409-1-607409-11.

(Continued)

*Primary Examiner* — Dangelino Gortayo
(74) *Attorney, Agent, or Firm* — Oblon, Spivak, McClelland, Maier & Neustadt, L.L.P.

(57) ABSTRACT

Embodiments of the invention relate to a method for video retrieval by providing a first audio video file, determining a first identifier of a first piece of music in the first audio video file, looking up for the first identifier first meta data in a music database, in which said first meta data are associated with said first identifier, providing second meta data of a second piece of music from the music database. The second piece of music is included in a second audio video file. Further the method is conducted by determining a similarity measure by comparing the first and second meta data, and providing the second audio video file or an identifier thereof depending on the similarity measure. Further embodiments relate to a server, a user device and a system and a computer program product for video retrieval.

17 Claims, 9 Drawing Sheets

OTHER PUBLICATIONS

Zeeshan Rasheed, et al., "Movie Genre Classification by Exploiting Audio-Visual Features of Previews", IEEE, vol. 2. 2002, pp. 1086-1089.

R. S. Jasinschi, et al., "Automatic TV Program Genre Classification Based on Audio Patterns", IEEE, 2001, pp. 370-375.

Sarat Venugopal, et al., "Audio Scene Analysis and Scene Change Detection in the MPEG Compressed Domain", IEEE, Sep. 13-15, 1999, pp. 191-196.

Silvia Pfeiffer, et al., "Automatic Audio Content Analysis", INFORMATIK, Apr. 1996, pp. 21-30.

Office Action issued Apr. 27, 2012 in European Application No. 09 004 184.9.

* cited by examiner

CONTEXT BASED VIDEO FINDER

Embodiments of the invention relate to a method, a server, a user device and a system for video retrieval. The embodiments further relate to a respective computer program product.

BACKGROUND

The popularity of online video communities is one reason for a strong growth of video databases. Browsing such big collections is often time consuming and cumbersome for the user and, therefore, it is difficult for a user to find a preferred video he would like to watch.

Thus, finding videos of interest in large video databases has become a challenging task.

BRIEF SUMMARY

It is an object of the embodiments to provide a method and a server for video retrieval.

This object is solved by a method and a server according to claims 1 and 15.

Further details will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
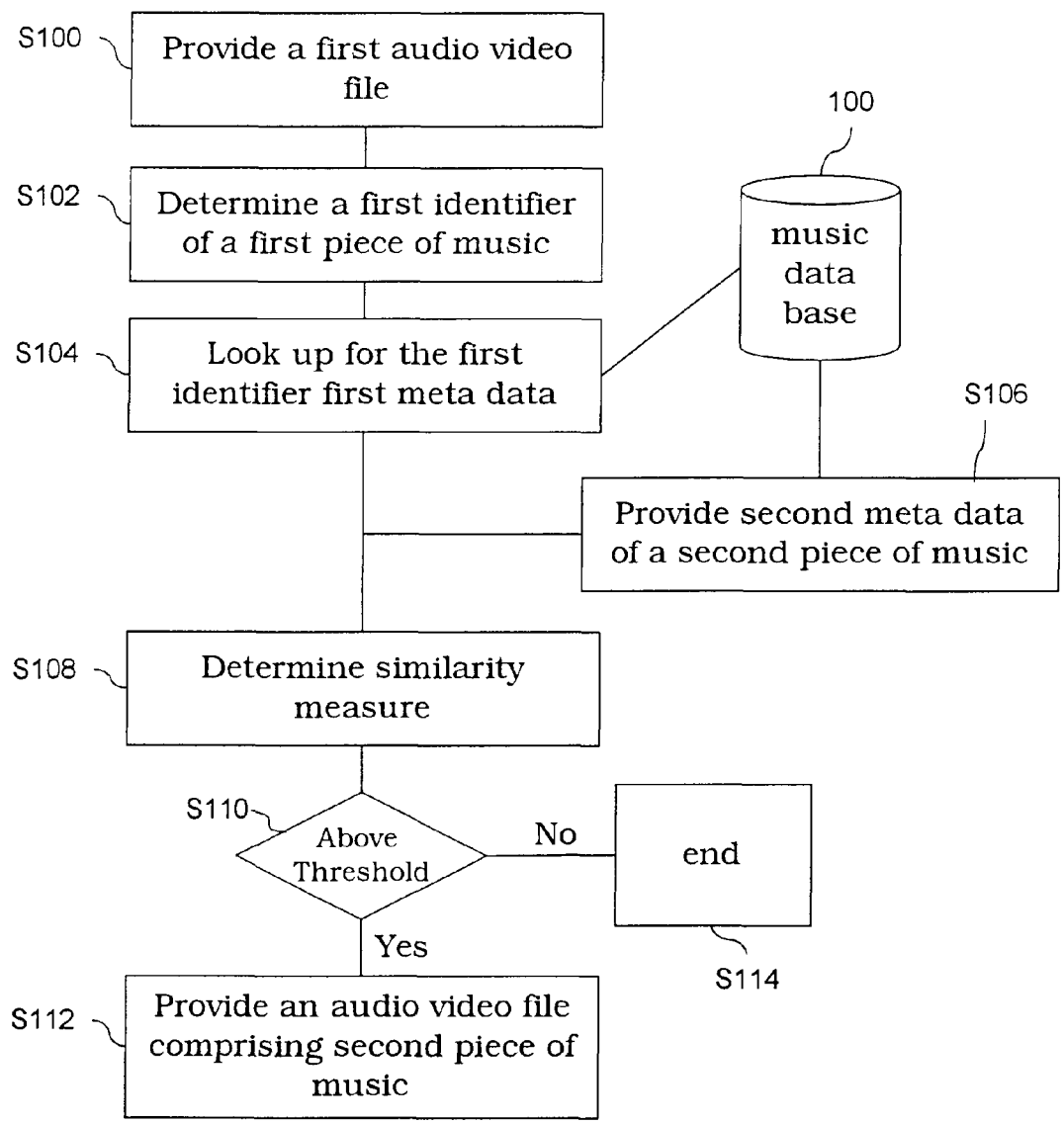
FIG. 1 shows an embodiment of a method for video retrieval.

In FIG. 1, a method for video retrieval according to an embodiment is shown. At S100 a first audio video file is provided for example by a user and/or an application. The first audio video file may comprise video data and audio data, the audio data including at least one piece of music.

The first audio video file may include encoded music data. The source of the first audio video file may be a video database. The first audio video file may also be provided via the internet, an intranet, from a local or remotely located storage, by a portable storage medium (e.g. memory stick or the like), and/or by the user via a graphical user interface.

At S102 a first identifier of a first piece of music included in the first audio video file is determined. Determining said first identifier may comprise determining a fingerprint of an audio signal of said first piece of music. Said fingerprint may be the first identifier.

In a further embodiment, it would also be possible that a piece of music is directly provided which would then be used for finding videos including the piece of music or at least similar pieces of music.

In a further embodiment, it would also be possible that a first identifier of a piece of music is directly provided which would then be used for finding videos including the piece of music or at least similar pieces of music. In this embodiment, in FIG. 1, block S100 would be skipped.

At S104 for the first identifier meta data are looked up in a music database 100, in which said first meta data are associated with said first identifier. The look-up table, in which fingerprints are associated with identifiers, may as well be integrated in the music database 100. This integration makes it possible that the fingerprints may as well be used as meta data.

At least one meta data descriptive of at least one property of the first piece of music is looked up, but it may be as well possible to look up more than one meta data, thus, more than one property of the first piece of music may be looked up.

The meta data in the music database 100 are associated with an identifier of a corresponding piece of music. The meta data may have been determined independently from the originally provided audio video file including the piece of music. The meta data may be based on a music file and/or an audio video file, which is obtained independently from said originally provided audio video file. For example, a piece of music in an audio video file may comprise only several seconds of a piece of music, e.g. a song. The several seconds of the piece of music may nevertheless allow determining an identifier of the piece of music, e.g. a fingerprint. The identifier may then be used to look-up meta data for the piece of music. Therefore, in the respective data base, the meta data may be associated with one or a plurality of identifier that have been determined based on the same algorithms used for calculating the identifier of the several seconds of the piece of music. Of course, the meta data will then be descriptive of the whole (entire length) of the piece of music. Thus, for example, the meta data "average beats per minute" will be related to the entire piece of music and not only on the several seconds of the piece of music. The meta data are therefore more reliable ("clean" meta data).

Thus, there is an advantage since only a few seconds of a piece of music can be used to determine meta data for the piece of music. These meta data will then be descriptive of the entire piece of music. Moreover, since these "clean" meta data will be used for the search of videos (see below, and reference sign S112 in FIG. 1), the search result can be improved.

The above shall be further illustrated at hand of an example: The music data base 100 in FIG. 1 may comprise identifiers (fingerprints) that are determined from "clean" audio data, e.g. entire songs from a CD or genuine audio file, based on an algorithm X for determining fingerprints. Moreover, for each song "clean" meta data may be determined, e.g. beats per minute and so on. When determining the first identifier, a fingerprint will be calculated based on algorithm X e.g. only for several seconds of a piece of music included in the first audio video file. This fingerprint may then be used for looking up the meta data in the music data base 100. Eventually, the thus determined meta data will be used for searching for similar songs and consequently for determining similar videos (see S112 in FIG. 1 detailed below). By such a procedure, the overall search result can be improved since the meta data are determined independently from the audio video file provided e.g. by the user. Thus, these are "clean" meta data, i.e. reliable meta data. Also, in this approach, the fingerprint determined based on the audio signal of the audio video file may be substituted by a further fingerprint determined based on the "clean" audio signal provided from the data base. This further fingerprint may then be used as identifier for identifying a piece of music in the second audio video file.

Regarding the term "fingerprint", this may refer to an acoustic fingerprint that may be a condensed digital summary, deterministically generated from an audio signal that can be used to identify an audio sample or quickly locate similar items in an audio database.

Properties have here the meaning of a generic term of meta data which are descriptive for the same property. For example artist is the property while "U2" may be the meta data of the first piece of music and "Prince" may be the meta data of a second piece of music. As well other descriptive information of the pieces of music may be used to retrieve similar videos. Thus, properties relate to the meta data as they are discussed in more detail in conjunction with FIG. 4. Examples may be mood of the music, artist or beats per minute or any other descriptive element as it will be shown below. It is further noted that as well fingerprints may be meta data.

At S106 second meta data of a second piece of music, which is included in a second audio video file are provided. The source for the second meta data may be the same music database 100, where the first meta data have been looked up, or alternatively another music database. The second meta data may as well be provided via the internet, an intranet and/or from a local or remotely located storage. The meta data provided for the second piece of music may be descriptive for at least one property that has been looked up for the first piece of music. For example when the artist for the first identifier of the first piece of music is looked up as well the artist of the second piece of music is provided. The meta data for the second piece of music may as well be descriptive for more than one property of the second piece of music and in case that the meta data descriptive for the same properties have been looked up at S104, a refinement of the video retrieval functionality may be achieved.

At S108, a similarity measure is determined. The similarity measure is descriptive of the similarity of the first piece of music and the second piece of music. This similarity measure is generated by comparing the first meta data associated with the first identifier of the first piece of music and the second meta data of the second piece of music.

Depending on the type of meta data, the comparison may be conducted in different ways. If the meta data comprises numbers, e.g. in case of beats per minute, these numbers may directly be compared by e.g. determining the ratio between the two numbers and thus the similarity measure may be a number. In other cases where the meta data is based on categories, e.g. for meta data being descriptive for the artist name, the similarity measure may be based on a more complex comparison algorithms. For example the full string of the artist name may be compared, or parts of the name may be compared, or the number of identical letters may be compared. The similarity measure may be binary information with the meaning of "yes" or "no".

As will be discussed below, at S112, the second audio video file or an identifier thereof is provided, for example to a user and/or an application, depending on the similarity measure. The dependence may result from a comparison of the similarity measure with a threshold.

Thus, at S110, the similarity measure may be compared with a threshold. The type of threshold depends on the similarity measure. Therefore, the threshold may be set by setting a number or a content such as "yes" or "no", "1" or "0". It is as well obvious that in dependence of the determination of the similarity value, the threshold needs to be defined. For example if the ratio for the similarity measure is beats per minute for the first identifier of the first piece of music divided by beats per minute of the second piece of music, the threshold would be set as a value deviating from the value one. In this case the similarity measure may have values larger or smaller than the value one. If however the similarity measure is defined to be always the ratio of the smaller number to the larger number, the threshold may be set as numbers being between larger than a number smaller than 1. Further, it is correspondingly possible to set a threshold value to be an upper boundary condition, so that the similarity value has to be below the threshold. Correspondingly the threshold may as well be a conditional threshold with the meaning of "being equal to". This may e.g. applicable if the similarity measure is the comparison of strings.

It may as well be possible to set the threshold for the retrieval of a video that is as different as possible from the first audio video file. For example if a user has watched a movie he did not like at all, he may be interested to retrieve videos which are different from the video he did not like, i.e. the first and second meta data have a predefined distance from each other. Thus, the definition of the similarity measure may be set, so that the condition of the similarity measure to be above the threshold is only fulfilled if the first meta data and the second meta data differ.

Such a broad flexibility in setting and selecting the threshold value allows defining a search adapted to the need or interest of the user and avoids misleading video retrieval. Thus, the property described by the meta data to determine the similarity measure and a user may select the definition of the similarity threshold. However, the property described by the meta data to determine the similarity measure and the definition of the similarity threshold may as well be pre-set resulting in a lower effort for the user and the administrator, an easier usage of the method and a higher automation level of the video retrieval functionality.

At S112 the second audio video file or an identifier thereof (second identifier) is provided for example to the user and/or a further application or any other requestor for the functionality of video retrieval depending on the similarity measure. For example, if the similarity measure fulfills a threshold condition, for example being larger than a threshold, at S112 the second audio video file or an identifier thereof (second identifier) is provided.

As described above, as well more than one meta data descriptive of the first piece of music may be looked up. Correspondingly as well more than one meta data may be used for the similarity measure determination at S108. The similarity measure may be condensed to one similarity measure at S108. However, as well a plurality of similarity measures may be determined and compared to a plurality of thresholds at S110. The result of this comparison of a plurality of similarity measures with a plurality of thresholds may then be condensed into one similarity measure that is compared to one similarity threshold and may be described by a similarity distance measure.

If the similarity measure does not fulfill the threshold condition, the process may be terminated at S114. However, the method may be applied repetitively in that a music database of meta data of various pieces of music included in audio video files are scanned for similarities to a first piece of music. This may be achieved by repetitively conducting S106 to S110. The option to repeat the video retrieval is as well applicable in combination with any subsequent embodiment. The benefit of such a scanning function is the automation of the video retrieval functionality for video databases and allows to obtain a list of similar audio video files. The repetitive video retrieval may as well be used for an efficient management of a video database in that the videos may be grouped and non-relevant videos may be erased to save storage capacity or the video database may be rearranged to allow for a less time consuming and/or less computational power requiring usage of the video database.

As described above a music file and/or an audio video file used to determine the meta data may be available independently from the originally provided first audio video file. Therefore the steps of looking up the first and second meta data and the step of determining the similarity measures may be conducted prior to and/or independently from the provision of the first audio video file. The result of this determination of the similarity measure may be stored in a similarity database comprising a similarity matrix of pieces of music and therefore the similarity measures associated with corresponding identifiers of the first and second piece of music may be directly looked up and used for the provision step of the second audio video file. This (independent) pre-calculation of the similarity can safe computing time when searching the second audio video file based on the first audio video file.

Beyond the provision of the second audio video file or the second identifier the similarity measure itself may be provided in combination with the second audio video file or the identifier thereof at S112. This would have the beneficial effect that a receiver of the information may have a further decision criterion how to proceed with the corresponding information. For example, in case that he has experience with the method, he may know that even though there is a similarity threshold, he only wants to continue with a video which fulfills his own similarity measure condition.

Applying a method according to the embodiment show in FIG. 1 may have the advantage that the music in a video may be very characteristic for the video content and may be, therefore, appropriate to be used to identify similar videos. This is for example the case for television series, which have the identical music trailer thus having identical pieces of music in the audio data, but may vary regarding the content of their video data.

Another benefit of using a similarity of pieces of music for video retrieval may be that the descriptive information may be obtained with less effort in comparison to descriptive information of the video data. This may e.g. be the case for feature extraction methods for music in that they require lower computational power as they are computationally efficient and the algorithms are of limited complexity. Further, it may be beneficial using a similarity of pieces of music for video retrieval, since the number of parameters to describe a piece of music may be kept small without limiting the capability to distinguish between videos including pieces of music to be similar or not. Therefore, a music database comprising the meta data of the descriptive information may be limited in the storage demand and therefore databases with a very large number of pieces of music may be realized. It is understood that adding further descriptive elements to the music database allows for a refinement of the retrieval of similar videos and the music database owner may design the music database according to his needs.

Figure 2:
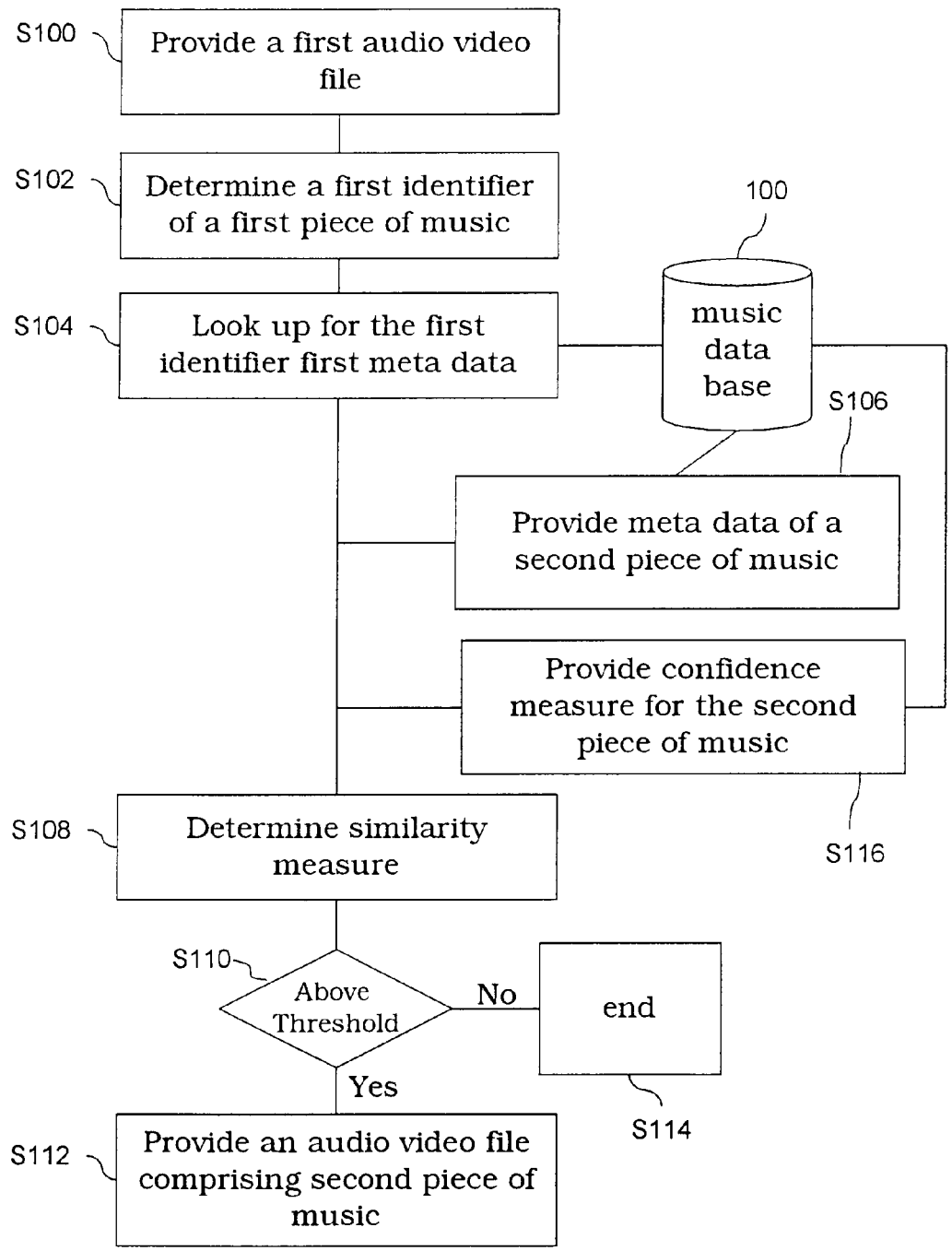
FIG. 2 shows a second embodiment of a method for video retrieval.

FIG. 2 shows a further embodiment of the method for video retrieval. In this embodiment additionally to S100 to S114 as described above a confidence measure may be provided at S116. The confidence measure may be descriptive of a probability that the second piece of music is correctly identified in the second audio video file. The source for the confidence measure may be the music database 100 or another music database. The confidence measure may as well be provided via the internet, an intranet and/or from a local or remotely located storage. The confidence measure may as well be included in the above described similarity database, wherein said identifiers are as well associated with audio video file identifiers.

The confidence measure is described in more detail below.

The similarity measure at S108 in FIG. 2 may then be determined in dependence on the confidence measure. For example if the confidence measure is very small, this may indicate that there is a little probability that the piece of music is correctly identified in the audio video file. Thus, there is a high probability that the audio video file does not comprise the identified second piece of music. By taking this confidence measure into account, when determining at S108 the similarity measure, only pieces of music with a high confidence level may result in high similarity measures.

Considering the confidence measure when determining the similarity measure may have the advantage that similar audio video files are retrieved with a higher accuracy. This may improve the video retrieval method selectivity, if the differences in the meta data are generally not very large. It may be as well of a major advantage if the second piece of music is included in many audio video files, as the additional criterion of the confidence measure may lead to a gradation of the similarity measure for the individual audio video files. Thus, not all the respective audio video files identified in the meta data to comprise the second piece of music may be provided to a user. Thus, an overwhelming of the user with a large number of audio video files may be avoided and the data transfer volume may be reduced. This confidence measure consideration further has a time and resources saving effect, if a large music database is compared to the meta data of first piece of music, since again a refinement of the comparison may be achieved.

The confidence measure may be defined as an exclusive criterion in that prior to comparing the other provided meta data at S106 the confidence measure must be above a threshold value. Only if this criterion is fulfilled the comparison in S108 may be continued. This may have the effect of an acceleration of the video retrieval process and may reduce the computational power requirements. As well other meta data may be identified to be such an exclusive criterion. For example if the first piece of music is identified to be performed by the artist "Prince" only pieces of music as well performed by the artist "Prince" may be selected and another meta data such as mood is compared at S108.

Figure 3:
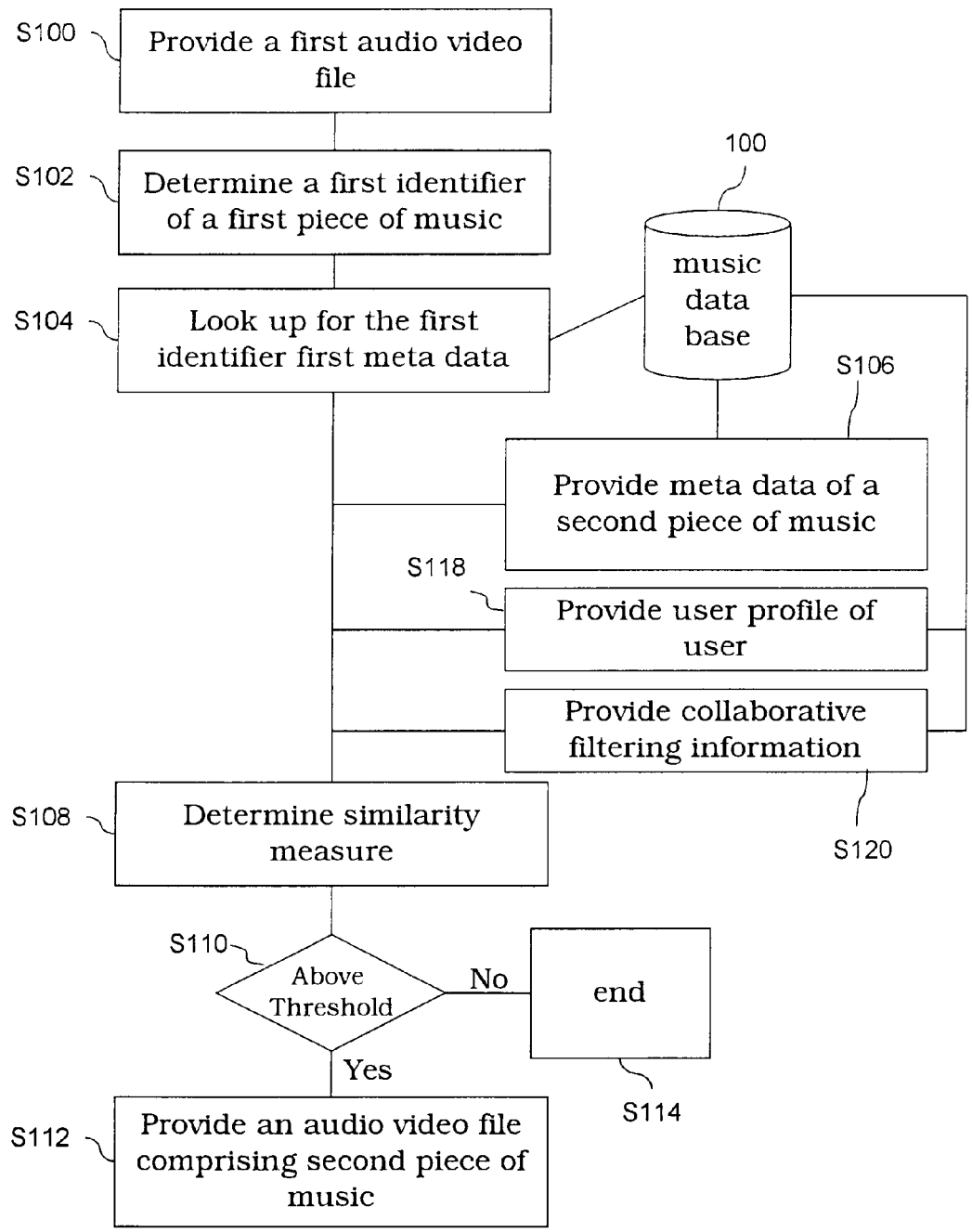
FIG. 3 shows a third embodiment of a method for video retrieval.

Another refinement option is shown in FIG. 3 showing another embodiment of the method for video retrieval. Additionally to S100 to S114 as described above use is made of collaborative filtering as an additional input for the similarity measure determination in S108. The similarity measure therefore may depend on a similarity of a user profile to collaborative filtering information.

At S118 the user may provide his user profile. Such a profile may include age, watching preferences, interests, music interests, home address, gender etc. The profile may be provided a priori before carrying out the method or during the carrying out the method. It may as well be provided upon request. The latter would have the advantage that it would not be necessary to have the profile data stored without carrying out the method, thus, it would allow limiting the storage space and the data management effort. Saving the profile once it has been entered would cause a lower effort for the user, using the method periodically.

At S120 collaborative filtering information may be provided. The collaborative filtering information may be descriptive of the listening behavior regarding the second piece of music or watching behavior regarding an audio video file comprising the second piece of music of different user groups and/or different users.

The similarity measure at S108 may then be determined in dependence on the user profile and the collaborative filtering information. For example, if the user is of an age below 35, he may want to have the second audio video file or an identifier thereof only provided if the respective second audio video file comprising the second piece of music has been watched very often by a user group of persons having as well an age below 35. By taking the user profile and the collaborative filtering information into account, when determining at S108 the similarity measure, only pieces of music or audio video files that are appreciated by a specific user group may result in high similarity measures.

Considering this collaborative filtering information in the similarity measure determination has the advantage that it may improve the video retrieval method selectivity. It may as well be of an advantage if the second piece of music was included in many audio video files, as the additional criterion collaborative filtering information leads to a gradation of the similarity measure for the individual audio video files. Thus, not all the respective audio video files may be provided to a user. Thus, an overwhelming of the user with a large number of audio video files may be avoided and the data transfer volume may be further reduced. This collaborative filtering information refinement further has a time and resources saving effect, if a large music database is compared to the meta data of first piece of music, since again a refinement of the comparison is achieved.

The collaborative filtering information refinement may be defined as an exclusive criterion in that prior to comparing a meta data provided at S106 the comparison of the user profile to the collaborative filtering information must yield a positive result. Only if this criterion is fulfilled the comparison in S108 is continued. This has the effect of an acceleration of the video retrieval process and reduces the computational power requirements.

It is noted that the collaborative filtering information meta data may be used in two different ways. At S120 the collaborative filtering information meta data of the second piece of music is compared to the individual user profile. However, the data may as well be used independent from a specific user. Therefore, the collaborative filtering information meta data may be used in the same way as any other meta data at S104 to S114 in FIG. 1.

Figure 4:
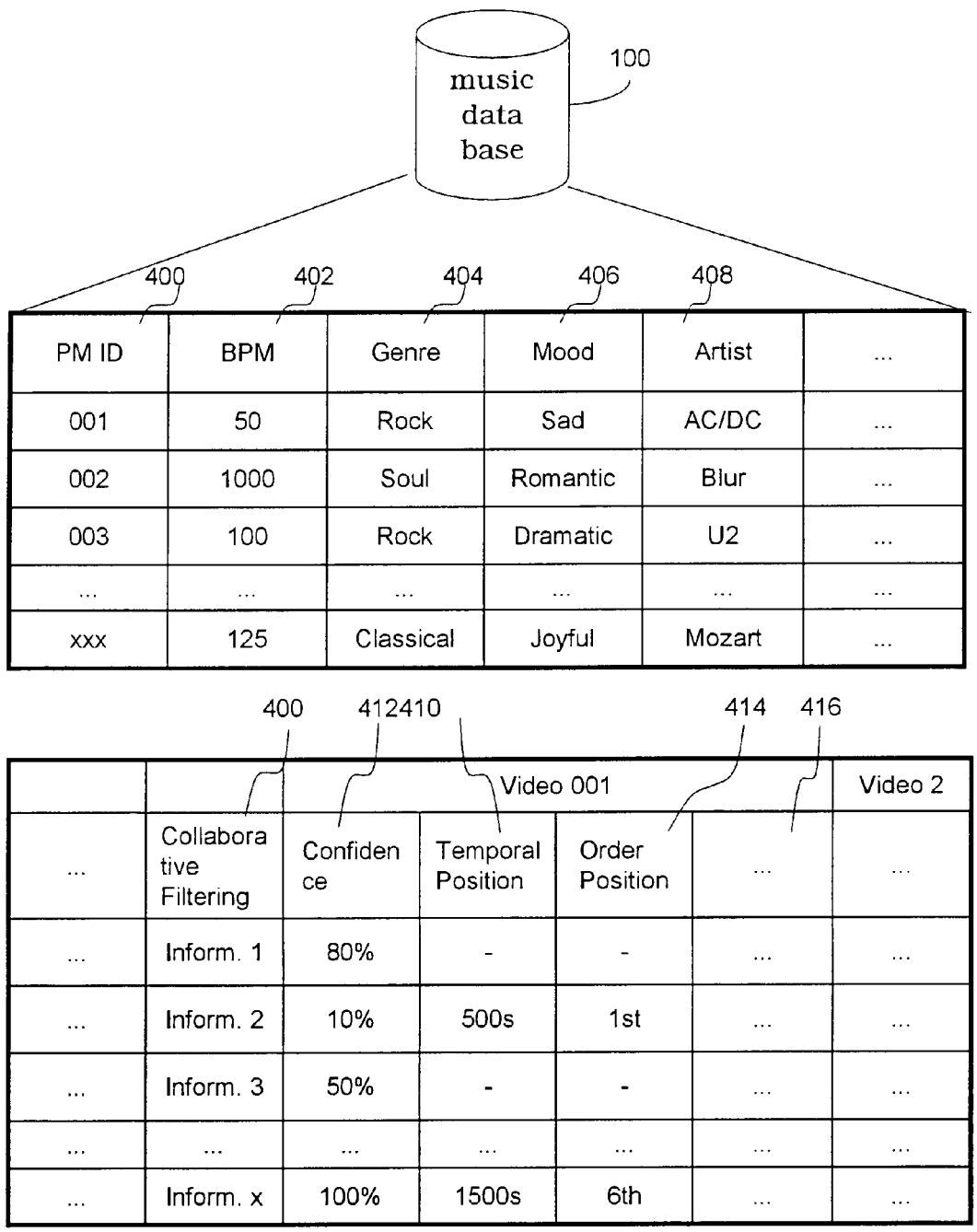
FIG. 4 shows an exemplary music database structure comprising meta data.

FIG. 4 shows an exemplary music database 100 with a non-terminated exemplary list of meta data 402, 404, 406, 408, 410, 412, 414, 416, 418. A PM ID 400 (identifier) may identify each piece of music. The meta data are descriptive for the corresponding pieces of music and may describe the genre 404 for example rock, soul, classical, folk or any other genre, the mood 406 for example sad, romantic, dramatic, joyful or any other mood, the title of the piece of music, the artist 408 associated with the piece of music for example as performing artist or composer of the piece of music, the beats per minute BPM 402, any other low level descriptor. The meta data may as well be descriptive of a piece of music in an audio video file. For example the temporal position 410 or the order position of pieces of music 412 or a length of a piece of music 414 may be represented by the respective meta data. Other meta data comprised in the music database may be collaborative filtering information 416 or confidence measure 418.

The arrangement of the meta data in the music database may as well be different from the example in FIG. 4 and the arrangement only needs to link the corresponding information.

For example the collaborative filtering data may be clustered in the music database or the similarity database as a user group/music matrix wherein the clusters contain the music a user group or listener group listened or likes. Therefore by finding the clusters similar music may be identified.

The meta data may be restricted to one dimension or may, alternatively, comprise a multidimensional representation. This flexibility allows for an optimized design of the music database according to the requirements and available hardware.

The different meta data may be grouped by different characteristics. A first group may be described as high level descriptors. Examples would be the title, the artist 408, the genre 404 or the mood 406. The meta data of this first group are normally not directly derivable from an audio signal of music, but are properties, which need to be identified separately from the audio signal of the piece of music. These meta data may allow a comparison of a first and second meta data descriptive of a title and an artist and/or a mood and/or a genre.

A second group of meta data may be described as low level descriptors. These meta data may be deduced from the audio signal music. Examples for these meta data are beats per minute, zero crossing rate, intensity fluctuation or relative position of intensity peaks or any other non-frequency spectrum based meta data for example time domain based descriptors. These non-frequency spectrum dependent meta data have the beneficial effect that they require low computational power. Frequency spectrum based descriptor such as Mel Frequency Cepstral Coefficients may as well be grouped under the term low level descriptors. These low level descriptors may be suited to generate a characteristic fingerprint of a piece of music and allow for a high refinement for the video retrieval method. All these meta data of the second group have the beneficial effect that they may be extracted from the audio signal of a piece of music automatically. These meta data may allow a comparison of first and second meta data descriptive of beats per minute BPM and/or of a further low level descriptor. If low level descriptors are calculated in the time domain only, this may save computational power.

Figure 5:
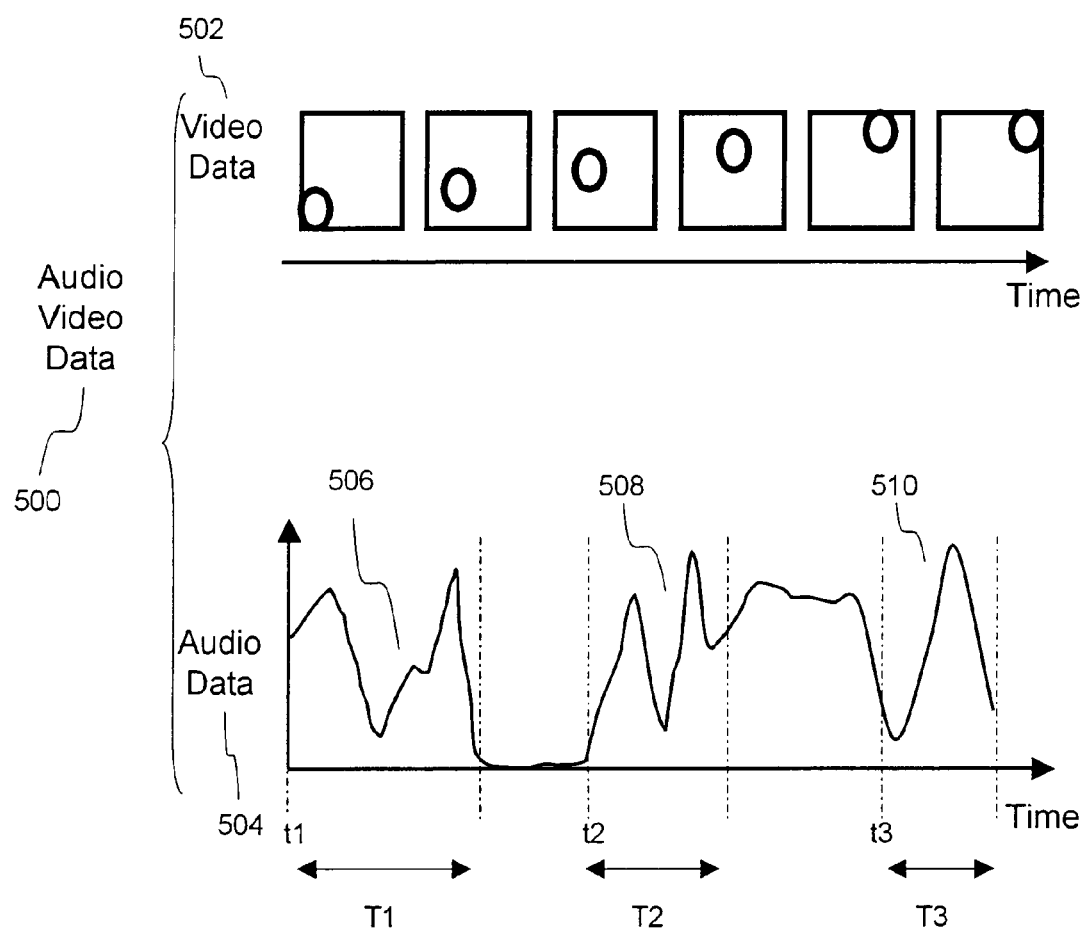
FIG. 5 shows an audio video file comprising video data and audio data.

A third group of meta data may be described as time dependent and video specific descriptors. Examples are the temporal position 410 or the order position of pieces of music 412, a length of a piece of music 414 or a temporal distance between pieces of music. In FIG. 5 temporal positions and the lengths of pieces of music are shown schematically. A piece of music 506 included in a video file 502 in an audio video file 500 has a temporal position of t1 and a length of T1. Correspondingly, piece of music 508 comprised together with the video file 502 in the audio video file 500 has a temporal position of t2 and a length of T2 and piece of music 510 comprised together with the video file 502 in the audio video file 500 has a temporal position of t3 and a length of T3. Regarding the order position 412 in FIG. 4 the meta data in the music database 100 for pieces of music in a video corresponding to the audio video file 500 in FIG. 5 would be for piece of music 506 "first", piece of music 508 "second" and piece of music 510 "third". These time dependent and video specific meta data may be suited to distinguish between different audio video files having a large overlap in the pieces of music comprised in the audio file of the audio video file as this information is very audio video file specific. This information may be as well deduced in combination with the low level descriptor analysis automatically from the audio data of the audio video file by identifying the pieces of music through a characteristic fingerprint. These meta data may allow a comparison of a first and second meta data descriptive of a first and a second temporal position of the first and second pieces of music in the first and second audio video file, respectively, and/or of an temporal order of pieces of music included in the first and second audio video files, respectively, and/or of a first and second length of the first and second pieces of music in the first and second audio video file, respectively.

A further group of meta data may be described as environment dependent descriptors. Examples are the confidence measure or the collaborative filtering information. These features are supporting the video retrieval functionality by describing further characteristics of pieces of music. This information is preferably comprised as well in the music database 100, if the meta data provision at S106 is conducted via this music database 100. For example the collaborative filtering information may be based purely on playback statistics e.g. of all users.

Figure 6:
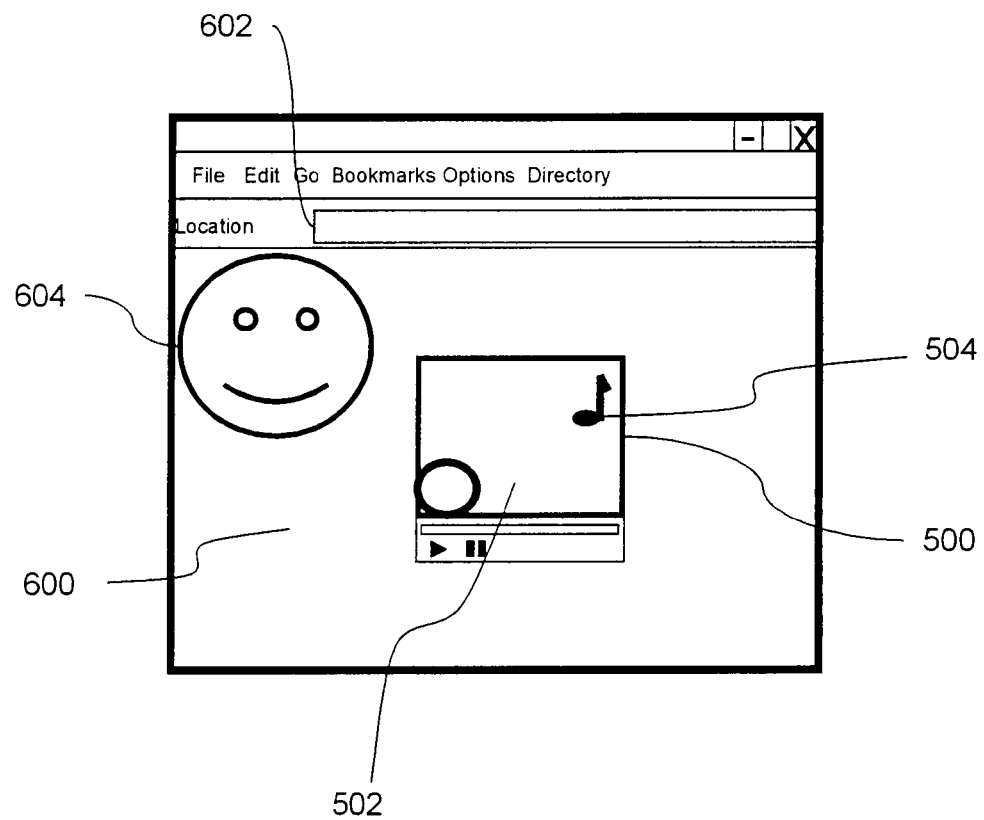
FIG. 6 shows a web page including an audio video file.

Other information, which may be used for the video retrieval, may comprise web page information that includes audio video files or is associated with audio video files. One example is shown in FIG. 6. An audio video file 500 comprising video data 502 and audio data including at least one piece of music 504 is included or associated with a web page 600. When providing a second audio video file at S112 the web page 600 may as well be provided to the user. The provision of the web page 600 may be achieved via the provision of internet address 602 or a link thereto. This provision of the web page may have the advantage for the user that he may find internet web pages connected to other audio video files of interest for him. It further has the beneficial effect that the volume of data traffic may be reduced as only the identifier of the second audio video file needs to be provided and the user is immediately informed of a location where he may watch the respective video.

The web page may as well comprise a design. This design may be used for determining the similarity measure of a first and second piece of music by comparing the design of a first web page including the first audio video file comprising the first piece of music with a design of a second web page including a second audio video file comprising the second piece of music. Such a design may be any visual element characteristic for the web page. Examples of such visual elements may be logos, emblems, background color, patterns, text elements, fonts, specific style elements or alike.

Figure 7:
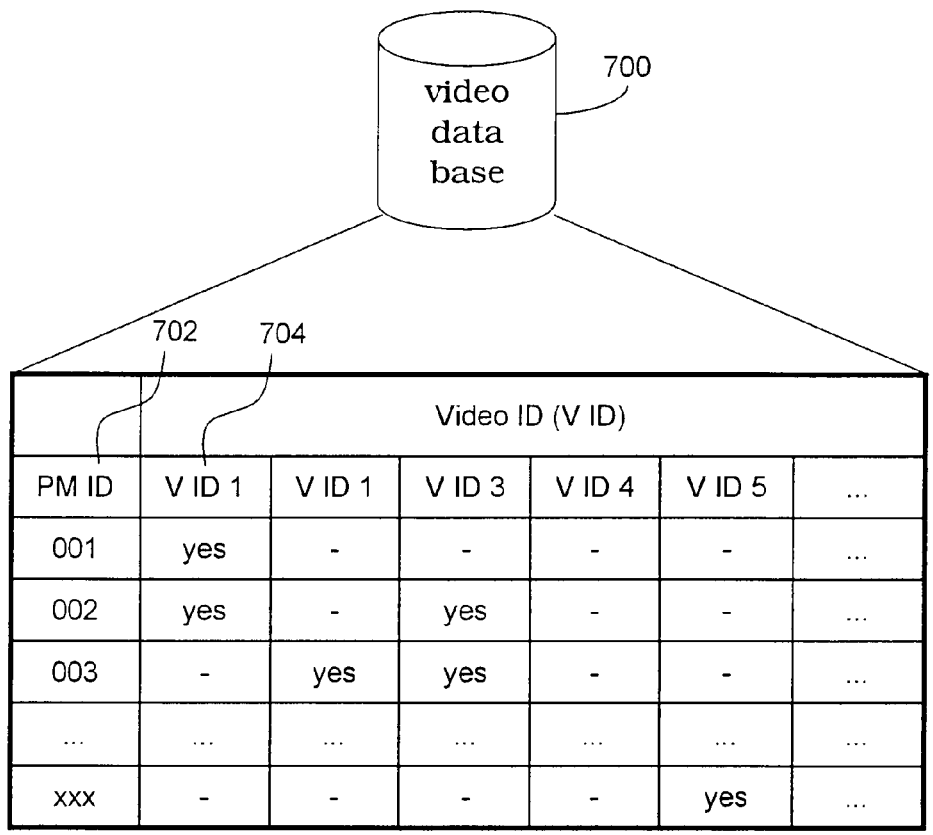
FIG. 7 shows an exemplary video database structure referencing pieces of music to audio video files.

As described above the method for video retrieval according embodiments may be used for audio video file retrieval in a video database. Such a video database 700 is shown in FIG. 7. In the video database 700 each audio video file is identified (indexed) by its index V ID (identifier) 704 and pieces of music in the audio video file are identified by their index PM ID (identifier) 702. Thus, in combination with the above described music database the provision of the second audio video file at S112 may be further automated in that the second piece of music which is provided at S106 is linked to at least one audio video file in the video database 700 and the provision of the second piece of music at S106 and the provision of the second audio video file at S112 is conducted automatically from the music database and the video database respectively.

The video retrieval may as well be based upon extracting low level descriptors or high level descriptors from audio data comprised in audio video files. This information may be stored as meta data in a descriptor-video database, in which every audio video file is linked to its meta data.

In this embodiment a first audio video file is provided by a user, for which the user is interested to know other similar videos, one or more low level descriptors or high level descriptors are extracted from the audio file comprised in the first audio video file. These descriptors are compared to the corresponding descriptors for a second audio video file. The descriptors of the second file may be obtained by the same feature extraction as it has been conducted for the first audio video file or may be looked up in the descriptor-video database. A similarity measure is determined by comparing the descriptors of the first and second audio file and if the similarity is found to be above a threshold, the second audio video file is provided to the user. This video retrieval may be combined with the video retrieval upon piece of music identification as described above. Web page information, confidence measure or collaborative filtering information may be used to refine the similarity measure determination for this feature based analysis in the same manner as it has been described above for video retrieval method based on piece of music identification.

The execution of video retrieval may be conducted on correspondingly adapted devices or may be conducted on a system comprising a network of such devices.

Figure 8:
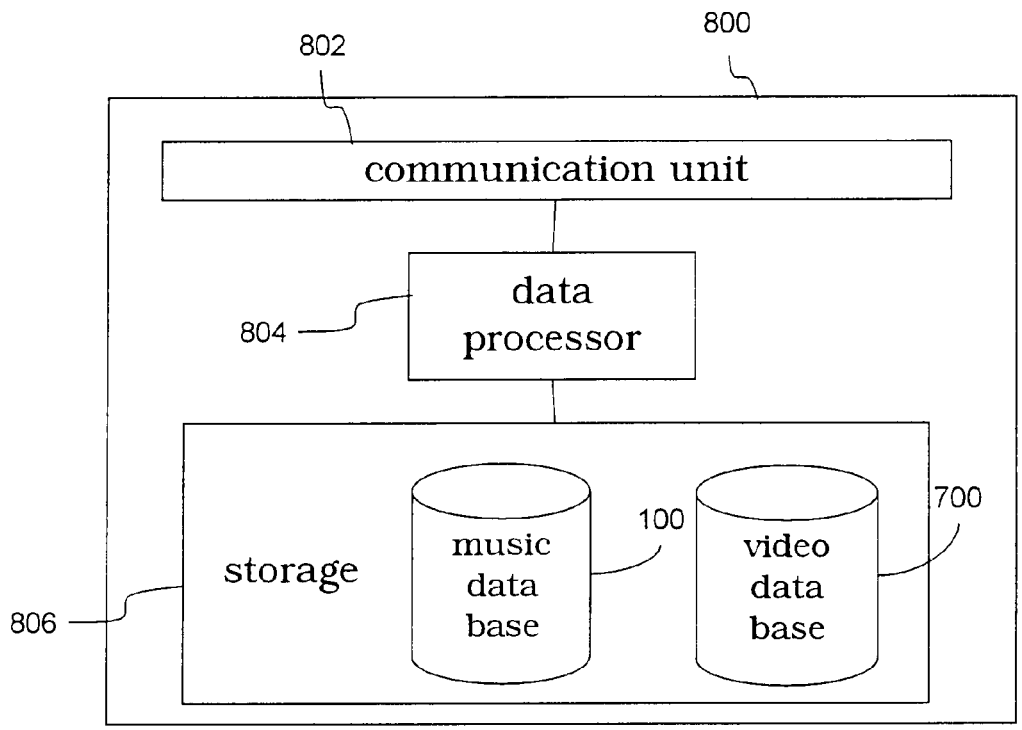
FIG. 8 shows an embodiment of a server for video retrieval.

In FIG. 8, a server 800 used for such a system is shown. Server 800 may comprise a communication unit 802 adapted to receive a first audio video file, a storage 806 adapted to store a music database 100 and a data processor 804 adapted to determine a first identifier of a first piece of music in the first audio video file, and to look up for the first identifier first meta data in the music database 100, in which said first meta data are associated with said first identifier, and to look up second meta data of a second piece of music from the music database 100, wherein the second piece of music is included in a second audio video file, the data processor further being adapted to determine a similarity measure by comparing the first and second meta data, and to provide, to the communication unit 802, the second audio video file or an identifier thereof depending on the similarity measure. Thereby the communication unit 802 is may further be adapted to send the second audio video file or the identifier thereof to a user. The storage 806 may further comprise a video database 700. The data processor 804 may as well comprise several processors optimized to conduct the specific tasks such as piece of music identification and identifier determination, looking up meta data or comparing the similarity measure with the threshold. The storage unit may comprise a similarity measure database.

Figure 9:
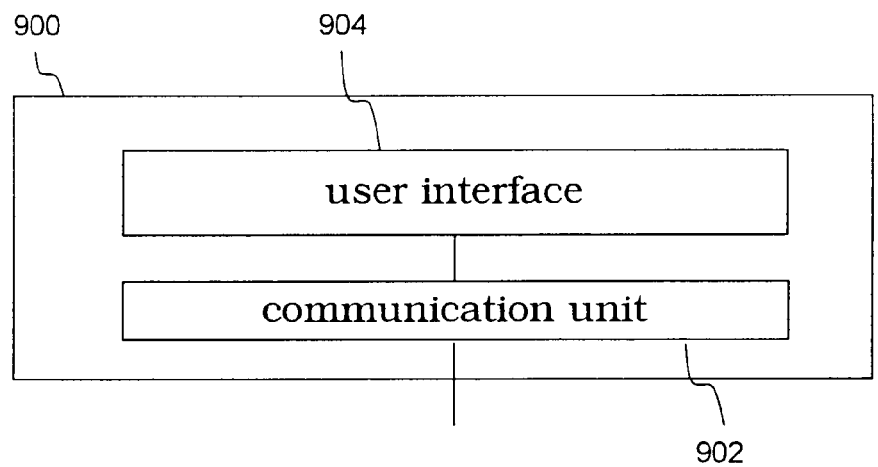
FIG. 9 shows an embodiment of a user device for video retrieval.

FIG. 9 shows a corresponding user device 900 adapted to communicate/cooperate with the server 800 shown in FIG. 8. Examples for such devices are computers, notebooks, mobile gaming machines, PDAs, mobile phones, wireless video cameras, interactive television receivers. The user device may comprise at least a communication unit 904 adapted to receive a second audio video file or an identifier thereof from server 800. Server 800 is, therefore adapted to receive, for example from said user device 900, a first audio video file, to store a music database 100, to determine a first identifier of a first piece of music in the first audio video file, and to look up for the first identifier first meta data in the music database 100, in which said first meta data are associated with said first identifier, and to look up second meta data of a second piece of music from said music database 100, wherein the second piece of music is included in a second audio video file, the data processor 804 further being adapted to determine a similarity measure by comparing the first and second meta data, and to provide, to the communication unit 902, the second audio video file or an identifier thereof depending on the similarity measure, and to send the second audio video file or the identifier thereof for example to the user device. Preferably the user device 900 comprises a user interface 904, which allows the user to provide an audio video file. This may be a DVD player, a CD player, a memory stick interface or even a graphical user interface with which the user may type in the name of the audio video file.

Figure 10:
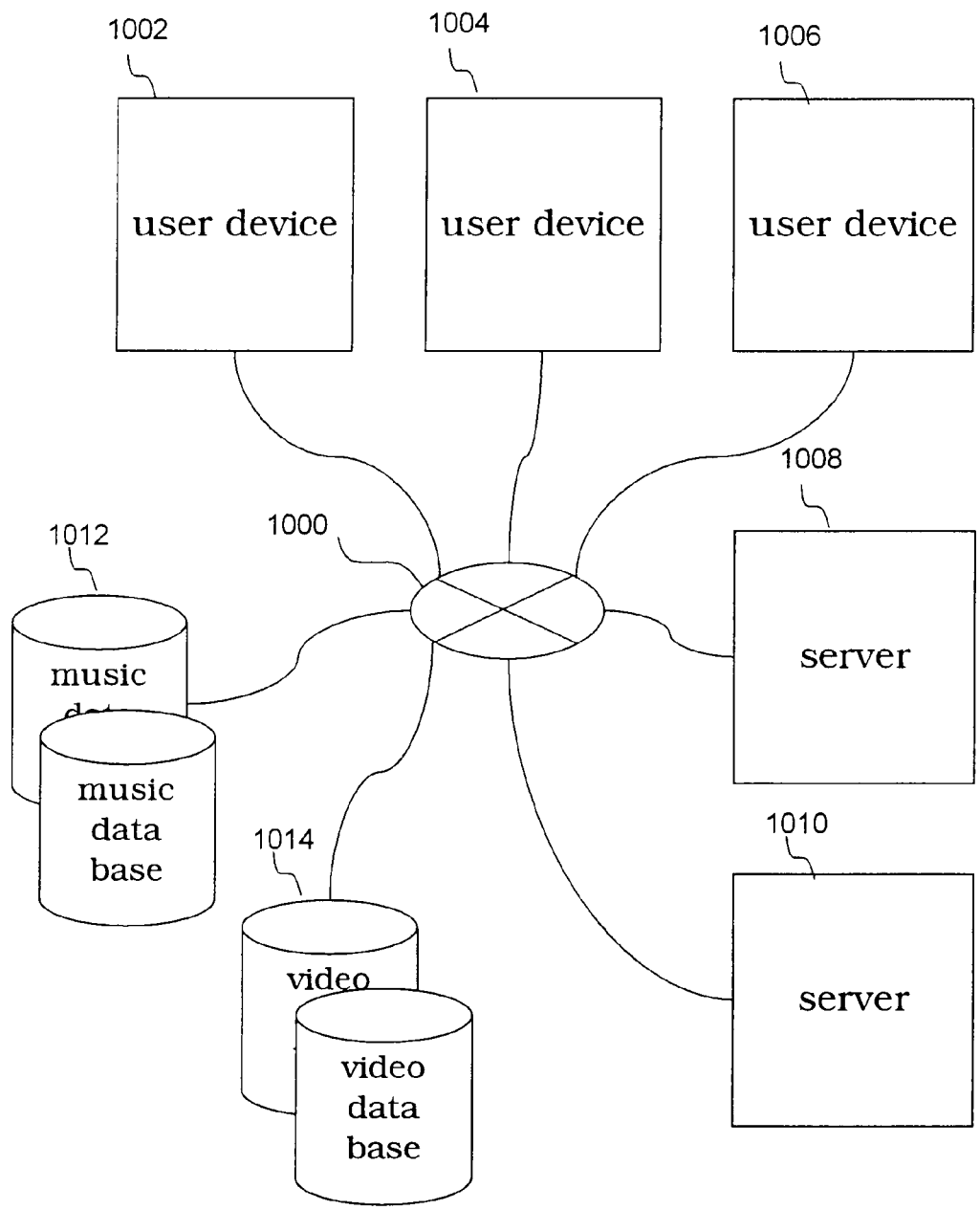
FIG. 10 shows an embodiment of a system for video retrieval.

FIG. 10 shows a system for video retrieval. It may comprise at least one server 1008, 1010 including a communication unit adapted to receive, from a user device 1002, 1004, 1006, a first audio video file or an audio video identifier thereof; a storage adapted to store a music database; a data processor adapted to determine a first identifier of a first piece of music in the first audio video file, and to look up for the first identifier of first meta data in the music database, in which said first meta data are associated with said first identifier, and to look up second meta data of a second piece of music in the music database, wherein the second piece of music is included in a second audio video file, the data processor further being adapted to determine a similarity measure by comparing the first and second meta data, and to provide, to the communication unit, the second audio video file or an identifier thereof depending on the similarity measure, wherein the communication unit is further adapted to send the second audio video file or the identifier thereof to the user device 1002, 1004, 1006, and at least one user device 1002, 1004, 1006 adapted to transmit, to the server 1008, 1010, the first audio video file and further adapted to receive the second audio video file.

The server 1008, 1010 may be a sever corresponding to the server 800 in FIG. 8, but the music database may be provided as a separate database or databases 1012 and correspondingly the video database may be provided as a separate database or databases 1014. The music database and the video database may be one database.

The different devices of the system may be connected by a communication connection 1000. The communication connection 100 may as well be configured to only provide a communication connection between different devices in a hierarchical communication structure.

FIGS. 8 to 10 show an exemplary set-up of the devices and a system for video retrieval. The individual tasks of the video retrieval method may as well be split differently between the different devices. This allows for a most efficient design of the system. It may be as well possible, that all tasks are integrated in a user device, thus, a device may be designed as a stand alone device.

Corresponding to the method for video retrieval a computer program product including computer program instructions that cause a computer to execute a method for video retrieval comprising—providing a first audio video file, determining a first identifier of a first piece of music in the first audio video file, looking up for the first identifier first meta data in a music database, in which said first meta data are associated with said first identifier, providing second meta data of a second piece of music from the music database, wherein the second piece of music is included in a second audio video file, determining a similarity measure by comparing the first and second meta data, and providing the second audio video file or an identifier thereof depending on the similarity measure.

Such a computer program product may be provided on a corresponding computer readable storage medium.

There may also be an embodiment as follows:

A method for video retrieval, comprising: providing, e.g. by a user, an audio video file; determining an identifier of a first piece of music in the audio video file, wherein the identifier is determined based on characteristic audio features (# fingerprint) of an audio signal of the piece of music; determining meta data and/or collaborative filtering information for the identifier independently from the audio signal based on a look-up table, wherein in the look-up table a plurality of identifiers of pieces of music are associated with respective meta data and/or collaborative filtering information; providing further meta data and/or further collaborative filtering information of a plurality of second pieces of music, wherein each of the second pieces of music is associated with a respective further audio video file of a set of further audio video files; determining a similarity measure for each of the second pieces of music, the similarity measure indicating a similarity of the first piece of music with a respective second piece of music, wherein the similarity measure is determined by comparing the meta data with the respective further meta data and/or by comparing the collaborative filtering information with the further collaborative filtering information; and providing, e.g. to the user, at least one audio video file of the set of further audio video files or an identifier thereof depending on the similarity measure.

Although specific embodiments have been illustrated and described herein, it will be appreciated by those of ordinary skill in the art that a variety of ultra net and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for video retrieval, comprising:
   providing a first audio video file;
   determining a first identifier of a first piece of music in the first audio video file, wherein the first piece of music can appear at any position within the first audio video file;
   looking up, using said first identifier, first meta data in a music database, in which said first meta data are associated with said first identifier, wherein the first meta data are descriptive of an entire piece of music identified based on the first piece of music;
   providing second meta data of a second piece of music from said music database, wherein the second piece of music is included in a second audio video file, wherein the second meta data are descriptive of an entire piece of music identified based on the second piece of music, and the second piece of music can appear at any position in the second audio video file;

determining, using a microprocessor, a similarity measure by comparing the first and second meta data; and providing the second audio video file or an identifier thereof, when the similarity measure meets or exceeds a predetermined threshold.

2. The method of claim 1, wherein at least one of the first and second meta data are descriptive of at least one of a genre, a mood, a title and an artist.

3. The method of claim 1, wherein at least one of the first and second meta data are descriptive of at least one of beats per minute (BPM) and of a further low level descriptor.

4. The method of claim 1, further comprising:
looking up, using said first identifier, third meta data in the music database, in which said third meta data are associated with said first identifier,
wherein at least one of the third and second meta data are descriptive of collaborative filtering information; and
the similarity measure is determined by comparing the first and third meta data with the second meta data.

5. The method of claim 1, further comprising:
providing a confidence measure indicating a probability that the second piece of music is correctly identified in the second audio video file, wherein the similarity measure depends on the confidence measure.

6. The method of claim 1, wherein the similarity measure depends on a similarity of the user profile to a collaborative filtering information.

7. The method of claim 1, wherein at least one of the first and second meta data are descriptive of a first and a second temporal position of the first and second pieces of music in the first and second audio video file, respectively.

8. The method of claim 1, further comprising:
looking up, using said first identifier, third meta data in the music database, in which said third meta data are associated with said first identifier,
wherein at least one of the third and second meta data are descriptive of an temporal order of pieces of music included in the first and second audio video files, respectively; and
the similarity measure is determined by comparing the first and third meta data with the second meta data.

9. The method of claim 1, further comprising:
looking up, using said first identifier, third meta data in the music database, in which said third meta data are associated with said first identifier,
wherein at least one of the third and second meta data are descriptive of a first and second length of the first and second pieces of music in the first and second audio video file, respectively; and
the similarity measure is determined by comparing the first and third meta data with the second meta data.

10. The method of claim 1, wherein the second audio video file is included in or associated with a web page and the web page is provided to the user.

11. The method of claim 10, wherein the first audio video file is included in or associated with a further web page and the similarity measure is determined by comparing a design of the first and second web pages.

12. The method of claim 1, wherein at least one of said first and said second identifier is a fingerprint.

13. The method of claim 1, wherein said first meta data are determined independently from said first audio video file based on at least one of a music file and an audio video file, which is obtained independently from said audio video file provided by said user.

14. The method of claim 1, wherein the similarity measure is provided in a similarity database comprising a similarity matrix of pieces of music.

15. A server, comprising:
a communication unit configured to receive a first audio video file;
a storage configured to store a music database;
a data processor configured to determine a first identifier of a first piece of music in the first audio video file, wherein the first piece of music can appear at any position within the first audio video file, and to look up, using said first identifier, first meta data in the music database, in which said first meta data are associated with said first identifier, wherein the first meta data are descriptive of an entire piece of music identified based on the first piece of music, and to look up second meta data of a second piece of music from said music database, wherein the second piece of music is included in a second audio video file, wherein the second meta data are descriptive of an entire piece of music identified based on the second piece of music, and the second piece of music can appear at any position in the second audio video file, the data processor being further configured to determine a similarity measure by comparing the first and second meta data, and to provide, to the communication unit, the second audio video file or an identifier thereof when the similarity measure meets or exceeds a predetermined threshold,
wherein the communication unit is further configured to provide the second audio video file or the identifier thereof.

16. A method for video retrieval, comprising:
providing a first audio video file;
determining a first identifier of a first piece of music in the first audio video file, wherein the first piece of music can appear at any position within the first audio video file;
looking up, using said first identifier, first meta data in a music database, in which said first meta data are associated with said first identifier, wherein the first meta data are descriptive of an entire piece of music identified based on the first piece of music;
providing second meta data of a second piece of music from said music database, wherein the second piece of music is included in a second audio video file, wherein the second meta data are descriptive of an entire piece of music identified based on the second piece of music, and the second piece of music can appear at any position in the second audio video file, and wherein at least one of the first and second meta data are descriptive of a first and a second temporal position of the first and second pieces of music in the first and second audio video files, respectively, and/or a temporal position and length of a found music segment within said first or second piece of music;
determining, using a microprocessor, a similarity measure by comparing the first and second meta data; and
providing the second audio video file or an identifier thereof, when the similarity measure meets or exceeds a predetermined threshold.

17. A method for video retrieval, comprising:
providing a first audio video file;
determining a first identifier of a first piece of music in the first audio video file, wherein the first piece of music can appear at any position within the first audio video file;

looking up, using said first identifier, first meta data in a music database, in which said first meta data are associated with said first identifier, wherein the first meta data are descriptive of an entire piece of music identified based on the first piece of music;

providing second meta data of a second piece of music from said music database, wherein the second piece of music is included in a second audio video file, wherein the second meta data are descriptive of an entire piece of music identified based on the second piece of music, and the second piece of music can appear at any position in the second audio video file;

determining, using a microprocessor, a similarity measure by comparing the first and second meta data; and providing the second audio video file or an identifier thereof, when the similarity measure meets or exceeds a predetermined threshold;

wherein at least one of the first and second meta data are descriptive of a temporal order of pieces of music included in the first and second audio video files, respectively.

* * * * *